United States Patent [19]

Kobayashi et al.

[11] Patent Number: 4,932,921
[45] Date of Patent: Jun. 12, 1990

[54] TORQUE VARIATION ABSORBING DEVICE

[75] Inventors: Kiyonori Kobayashi, Chiryu City; Masakazu Kamiya, Toyoake City; Junji Kagiyama, Toyota City, all of Japan

[73] Assignee: Aisin Seiki Kabushiki Kaisha, Kariya, Japan

[21] Appl. No.: 232,561

[22] Filed: Aug. 12, 1988

Related U.S. Application Data

[63] Continuation of Ser. No. 11,937, Feb. 6, 1987, abandoned.

[30] Foreign Application Priority Data

Feb. 6, 1986 [JP]  Japan ................................ 61-16032
Feb. 14, 1986 [JP]  Japan ................................ 61-20380

[51] Int. Cl.⁵ .......................... F16D 3/14; F16F 15/12
[52] U.S. Cl. ........................................ 464/68; 74/574; 192/106.2
[58] Field of Search ....................... 74/574; 192/106.2; 464/66, 67, 68

[56] References Cited

U.S. PATENT DOCUMENTS

| 4,220,233 | 9/1980 | Ban et al. ........................... 192/106.2 |
| 4,274,524 | 6/1981 | Nakane ............................... 464/68 X |
| 4,468,207 | 8/1984 | Yoshida ................................ 464/66 |
| 4,662,239 | 5/1987 | Worner et al. ......................... 74/574 |
| 4,663,983 | 5/1987 | Kobayashi et al. .......... 192/106.2 X |
| 4,715,485 | 12/1987 | Rostin et al. ..................... 464/68 X |

FOREIGN PATENT DOCUMENTS

| 200816 | 11/1984 | Japan ................................. 192/106.2 |
| 2153970 | 8/1985 | United Kingdom ............. 192/106.2 |

*Primary Examiner*—Daniel P. Stodola
*Attorney, Agent, or Firm*—Burns, Doane, Swecker & Mathis

[57] ABSTRACT

The torque variation absorbing device comprises a driving plate, a flywheel, and a spring mechanism, a damping and torque limiting mechanism and a hysteresis mechanism, installed between the driving plate and the flywheel. The damping and torque limiting mechanism is located radially inwardly of the spring mechanism. The damping and torque limiting mechanism includes a driven disk and a cone spring housing the flywheel. The driven disk is set to cross a center of an end face of the spring mechanism.

19 Claims, 6 Drawing Sheets

Fig. 2

TORQUE VARIATION ABSORBING DEVICE

This application is a continuation of application Ser. No. 011,937, filed Feb. 6, 1987, now abandoned.

BACKGROUND OF THE INVENTION

1. Field of the Invention

The present invention relates to a torque variation absorbing device for an engine.

2. Description of the Prior Art:

An engine for an automobile or an aircraft is equipped with a torque variation absorbing device in the power transmission path.

Known torque variation absorbing devices are disclosed, for instance, in Japanese patent publications SHO 55-20930, SHO 55-20964 and SHO 56-43176. A device of the prior art has two inertia members, i.e., a driving plate which is rotatably connected to an engine crankshaft and a flywheel which is connected to a follower device and is rotatable with respect to the driving plate. Between the driving plate and the flywheel, a spring mechanism and a damping and torque limiting mechanism are installed. In this device the rotation of the engine crankshaft is transmitted to the flywheel through the driving plate, the spring mechanism and the damping and torque limiting mechanism. Thus the torque variation is absorbed by the vibration system of these members.

However, in the above-mentioned device, the damping and torque limiting mechanism is located radially outwardly of the spring mechanism. Therefore, the slip velocity on a slidable part will be increased. As a result, the working life of the device will be reduced.

Further, the driving plate of the device is made from a machined casting which is likely to include cavities. Therefore, the plate must be made thick in order to maintain the structural strength of the plate. Consequently, it was difficult to make the device compact.

Figure 7:
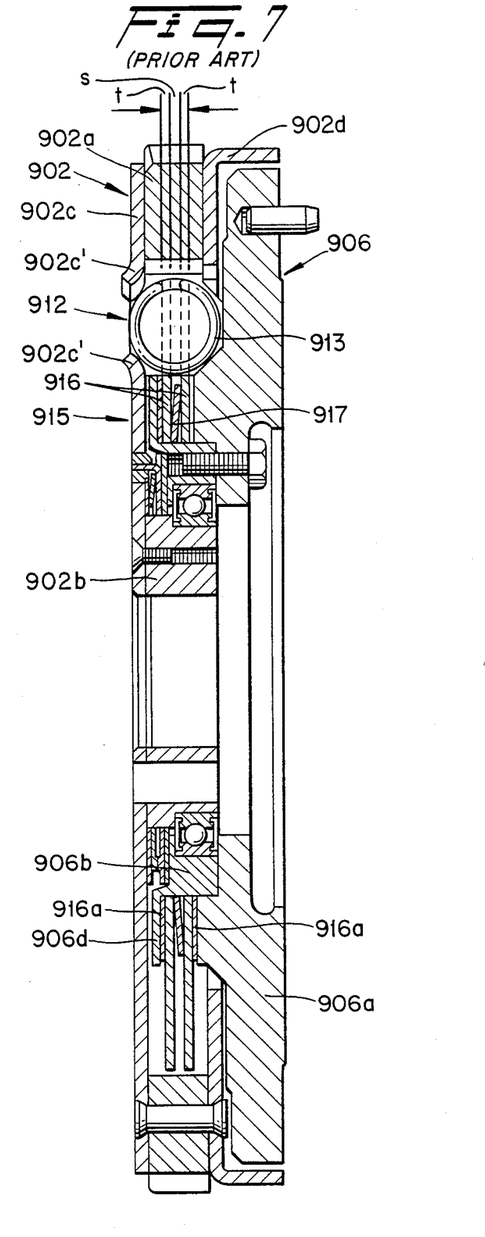
FIG. 7 is a sectional view of a torque variation absorbing device having a damping and torque limiting mechanism located radially inwardly of a spring mechanism.

The torque variation absorbing device shown in FIG. 7, was developed to solve the above-mentioned problems.

The torque variation absorbing device provides inertia members comprising a driving plate 902 coupled to the engine crankshaft and a flywheel 906 coaxially and rotatably supported on the driving plate 902. The side plate 902c of the driving plate 902 is designed as a separate member from the driving plate bodies 902a, 902b and is fabricated of steel. The steel plate is more reliable in strength than the casting and therefore can be constructed thinner. This thinner designing makes it possible to reduce the axial dimension of the driving plate 902 as compared with the case of a plate machined from a casting.

The periphery 902c' of the opening of the side plate 902c, where the spring mechanism 912 is housed, is bent outwardly in the axial direction by press-working or the like and the spring 913 can be housed even though the thickness of the driving plate 902 is reduced. Thus, the driving plate 902 can be successfully reduced in thickness. The bending of the periphery 902c' is possible, because the side plate 902c is fabricated of steel. Between the driving plate 902 and the flywheel 906 there is interposed a spring mechanism 912 and a damping and torque limiting mechanism 915. In the device, the slidable part of the damping and torque limiting mechanism 915 is located radially inwardly from the spring mechanism 912.

However, this device comprises two driven disks 916, 916 and the cone spring 917 disposed between two driven disks 916, 916. Therefore, the distance between the flange 906d of the driven plate 906b and the center of the end face of the spring mechanism 912 is the sum of the thickness of the lining 916a, the thickness t of the driven disk 916 and the half of the thickness S/2 of the cone spring 917.

OBJECTS AND SUMMARY OF THE INVENTION

An object of the present invention is to decrease the thickness of the driving plate in the axial direction by modifying its structure and to specifically accomplish this modification without causing any reduction of strength.

Another object of the present invention is to decrease the thickness of the torque variation absorbing device in the axial direction by modifying its structure to decrease the distance in the axial direction between the flange of the driven plate and the center of the end face of the spring mechanism. The torque limiting mechanism comprises a driven disk, two linings, a pressure plate, and a cone spring disposed between the flange of the driven plate and the flywheel. The driven disk is arranged on the center of the end face of the spring mechanism. The distance between the flange of the driven plate and the center of the end face of the spring mechanism is the sum of thickness of the lining and the half of the thickness of the driven disk.

BRIEF DESCRIPTION OF THE DRAWINGS

These and other objects and advantages of the present invention will become more apparent and more readily appreciated from the following detailed description of the preferred exemplary embodiments of the invention taken in conjunction with the accompanying drawings, wherein.

DETAILED DESCRIPTION OF THE PREFERRED EMBODIMENTS

A torque variation absorbing device constructed in accordance with a preferred embodiment of the present invention will be described with reference to the drawings.

Figure 1:
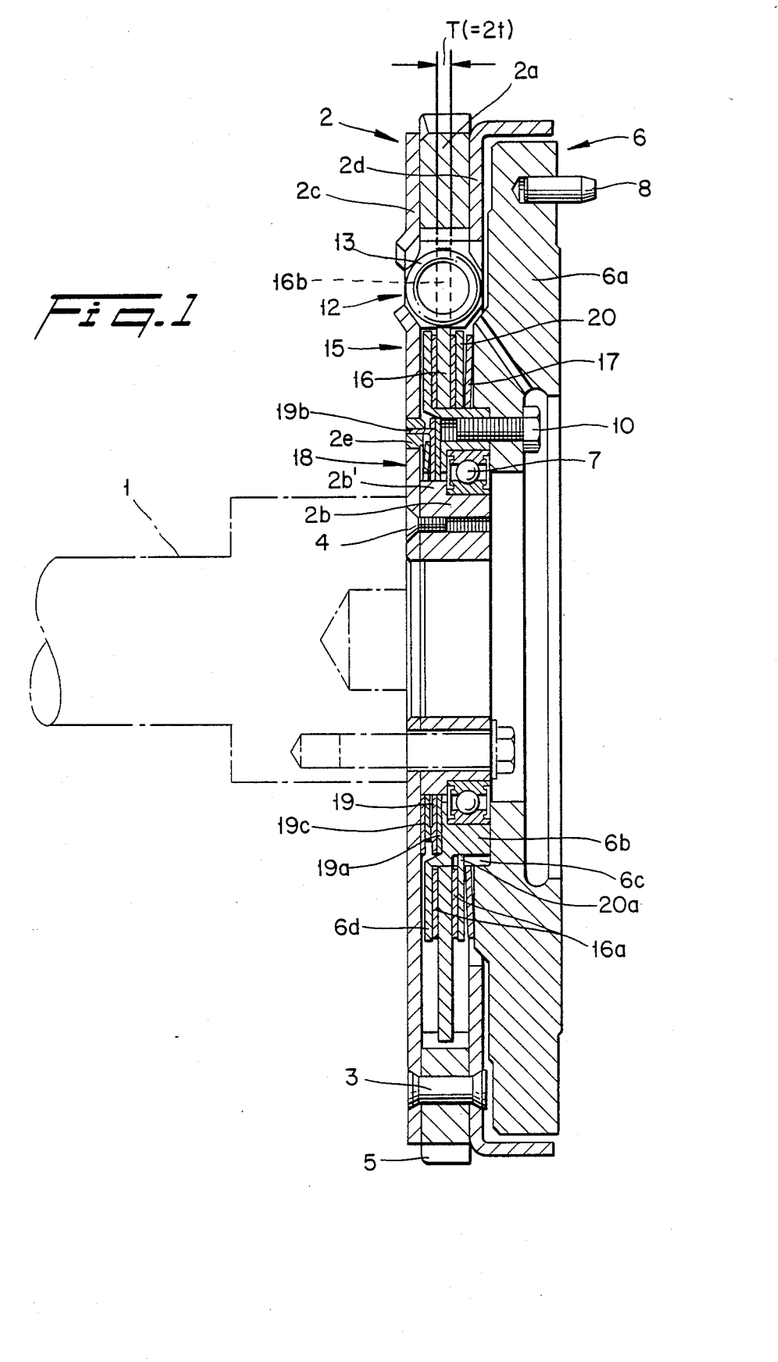
FIG. 1 is a sectional view taken along I—I in FIG. 2 of a torque variation absorbing device constructed in accordance with a first embodiment of the present invention.
Figure 2:
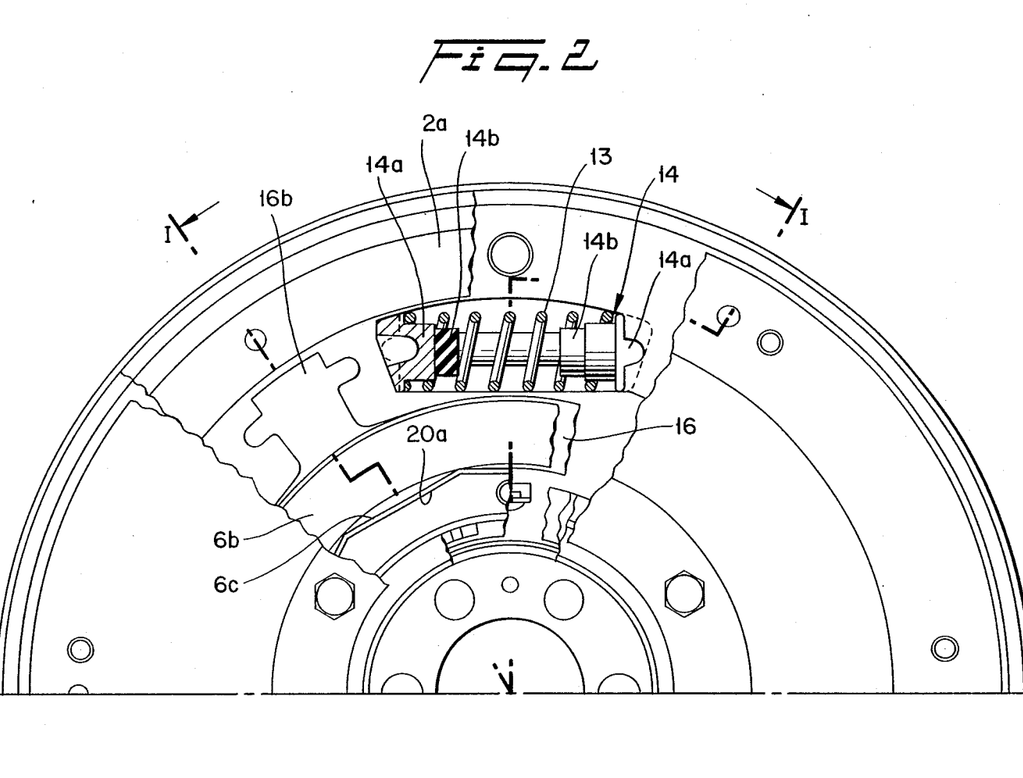
FIG. 2 is a partially sectional, elevation view showing an internal construction of the device of FIG. 1.

In FIGS. 1 and 2, a driving plate 2 is connected to an engine crankshaft 1, and the driving plate 2 and the engine crankshaft 1 rotate together. The driving plate 2 comprises a outer body 2a shaped like a ring, an inner body 2b shaped like a ring, and steel side plates 2c and 2d which clamp the body 2a from both sides by rivets 3. The steel side plate 2c clamps the body 2b by screws 4. On the periphery of the body 2a a ring gear 5 is formed for accommodating the starting of an engine. A projection 2b' on the inner body 2b receives a thrust force from the bearing 7 and thereby prevents the thrust force from acting on the side plate 2c. Steel fabrication of the side plate 2c and the reception of the thrust force by the projection 2b' allows the side plate 2c to be of thin construction. The side plate 2c has an opening, the rim of which is bent outwardly in the axial direction at a position where a spring mechanism 12 (vibration suppression mechanism) discussed later is housed, and this opening can be easily press-formed. Thus, the side plate 2c of the driving plate 2 is positioned between the engine crankshaft and the inner body 2b which functions as a bearing guide.

Parallel to the driving plate 2 and coaxial with the driving plate 2, the flywheel 6 is rotatably positioned with respect to the driving plate 2 and is rotatably supported by the driving plate 2 due to the bearing 7. A clutch-positioning pin 8 is provided for positioning a clutch not shown and a screw hole (not shown) is formed for fitting the clutch cover (not shown). The flywheel 6 is divided into a flywheel body 6a and a driven plate 6b so that the flywheel can house a damping and torque limiting mechanism 15 which will be described later. The flywheel body 6a and the driven plate 6b are connected together by means of bolts 10.

A spring mechanism 12 is provided between the driving plate 2 and the flywheel 6. The spring mechanism 12 is composed of a coil spring 13 and spring seats 14 provided at both ends of the coil spring 13. The spring seat 14 comprises a seat body 14a and a rubber element 14b deformable with a greater spring constant than the spring 13. The spring seats 14 at both ends of the coil spring 13 are identical in shape. A driven disk 16 is interposed between the driving plate 2 and the flywheel 6. The driven disk 16 is twisted with respect to the driving plate 2, when acted on by the torque of the driving plate 2. One of the spring seats 14 is able to contact one end, projecting inwardly in the radial direction of the driving plate 2, while the other spring seat 14 is able to contact a radial projection 16b of the driven disk 16 of damping and torque limiting mechanism 15 which will be described later. When no torque is acting, there is a gap between at least one of the spring seats 14 and at least one of the members 2a and 16b which the seat 14 is able to contact.

As seen from FIG. 1, the damping and torque limiting mechanism 15 is located radially inside of the spring mechanism 12. The damping and torque limiting mechanism 15, which is carried by the flywheel 6, comprises the driven disk 16, linings 16a, 16a, a pressure plate 20 and a cone spring 17. The linings 16a, 16a are disposed on the both sides of the driven disk 16, one of the linings 16a, 16a of abrasive material contacts the flange 6d of the driven plate 6b, and the other of the linings 16a, 16a contacts the pressure plate 20. The pressure plate 20 and the driven plate 6b each have planes 20a and 6c for engaging each other and rotating together. The cone spring 17 is disposed between the pressure plate 20 and the flywheel body 6a for pressing the disk 16 against the flange 6d of the driven plate 6b and the pressure plate 20. Vibrations due to torque variations can be damped by a sliding friction loss on the faces of the linings 16a. The thrust force of the driven disk 16 against the pressure plate 20 and the driven plate 6b depends upon the cone spring 17. When the torque is less than the frictional force which depends on this thrust force, the driven disk 16 and the flywheel 6 rotate together. When the torque exceeds the frictional force, relative slip takes place between the driven disk 16 and the flywheel 6 since the disk is rotatable independently of the flywheel, thereby releasing that portion of the torque in excess of the frictional force. The driven disk 16 includes a projection 16b crossing the center of the end face of the spring mechanism 12, and the thickness [T] of the driven disk 16 is equivalent to the thickness [2t] of the driven disks of FIG. 7. Therefore, the distance between the flange 6d of the driven plate 6b and the center of the end face of the spring mechanism 12 is the sum of the thickness of the lining 16a and the half of the thickness [T/2] of the driven disk 16.

The hysteresis mechanism 18 is located radially inwardly from the torque limiting mechanism 15 and between the driving plate 2 and the flywheel 6. In the hysteresis mechanism 18, a hysteresis plate 19 provided with a lining 19a of abrasive material is partially bent and a bent portion 19b is fitted into a hole 2e bored in the side plate 2c of the driving plate 2, thereby circumferentially fixing the hysteresis plate 19 to the driving plate 2. A cone spring 19c is installed between the hysteresis plate 19 and the side plate 2c, thereby pressing the lining 19a of the hysteresis plate 19 against the driven plate 6b. The sliding friction between the lining 19a and the driven plate 6b of the flywheel 6 produces a hysteresis.

The rotating torque of the engine crankshaft is transmitted to the driving plate 2 which rotates together with the engine crankshaft, and then to the flywheel 6 via the spring mechanism 12, the damping and torque limiting mechanism 15 and the hysteresis mechanism 18. Thereby, small variations of the torque of the engine crankshaft and the engine vibration can be absorbed by a vibration system which comprises the spring mechanism 12, the damping and torque limiting mechanism 15, the hysteresis mechanism 18 and the inertia members, i.e., the driving plate 2 and the flywheel 6.

For the purpose of effectively absorbing the vibrations in an idling state of an engine, a soft spring characteristic is required when the relative rotational displacement between the driving plate 2 and the flywheel 6 is small and a hard spring characteristic is required for the purpose of making the spring mechanism 12 compact when the relative rotational displacement is large. Further, when a larger torque than required acts, it is necessary for the purpose of protecting the power train to limit the torque and transmit it to the clutch.

For these purposes, when the torque is small, the gap between the spring seat 14 and the driven disk 16 and the low frictional force of the hysteresis mechanism 18 effectively act. Next, when the spring seat 14 and the driven disk 16 come into contact, the spring 13 deforms under an increased torque. With a further increase of the torque, the spring 13 deforms an even greater extent to cause the two spring seats 14 to deform under the increased torque. When the torque increases and exceeds a specified torque, a slip develops between the damping and torque limiting mechanism 15 and the flywheel 6, thereby releasing an excess of the torque. In this way, the torque can be transmitted to the power train with its variations effectively absorbed.

Figure 3:
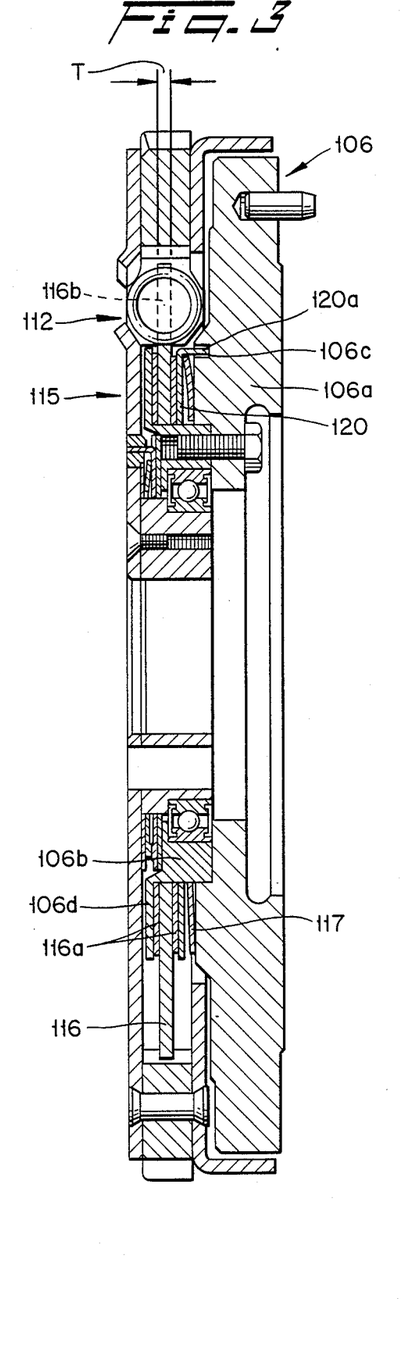
FIG. 3 is a sectional view of a torque variation absorbing device constructed in accordance with a second embodiment of the present invention.

In the second embodiment of the torque variation absorbing device in FIG. 3, a damping and torque limiting mechanism 115, which is carried by the flywheel 106, comprises a driven disk 116, linings 116a, 116a, a pressure plate 120 and a cone spring 117. The linings 116a, 116a are disposed on the both sides of the driven disk 116, one of the linings 116a, 116a of abrasive material contacts the flange 106d of the driven plate 106b, and the other of the linings 116a, 116a contacts the pressure plate 120. The pressure plate 120 has a projection 120a to be inserted in a slot 106c of the flywheel body 106a and to rotate with the flywheel body 106a. The cone spring 117 is disposed between the pressure plate 120 and the flywheel body 106a, to press the disk 116 against the flange 106d of the driven plate 106b and the pressure plate 120. The driven disk 116 includes a projection 116b crossing the center of the end face of the spring mechanism 112, and the thickness [T] of the driven disk 116 is equivalent to the thickness [2t] of the driven disks 916, 916 of FIG. 7. Therefore, the distance between the flange of the driven plate 106b and the center of the end face of the spring mechanism 112 is the sum of the thickness of the lining 116a and the half of the thickness [T/2] of the driven disk 116.

Figure 4:
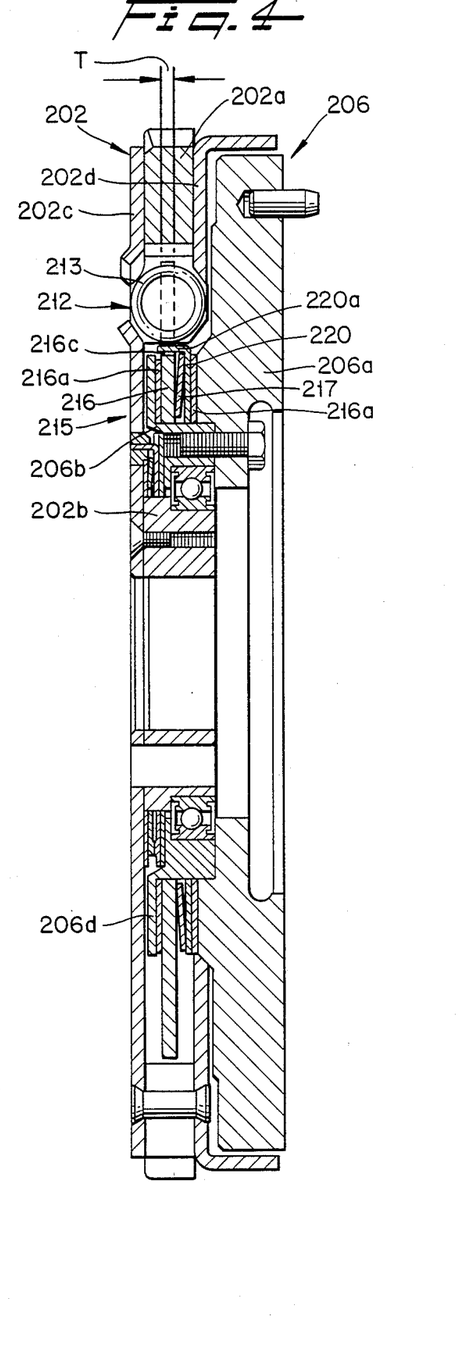
FIG. 4 is a sectional view taken along IV—IV in FIG. 5 of a torque variation absorbing device constructed in accordance with a third embodiment of the present invention.
Figure 5:
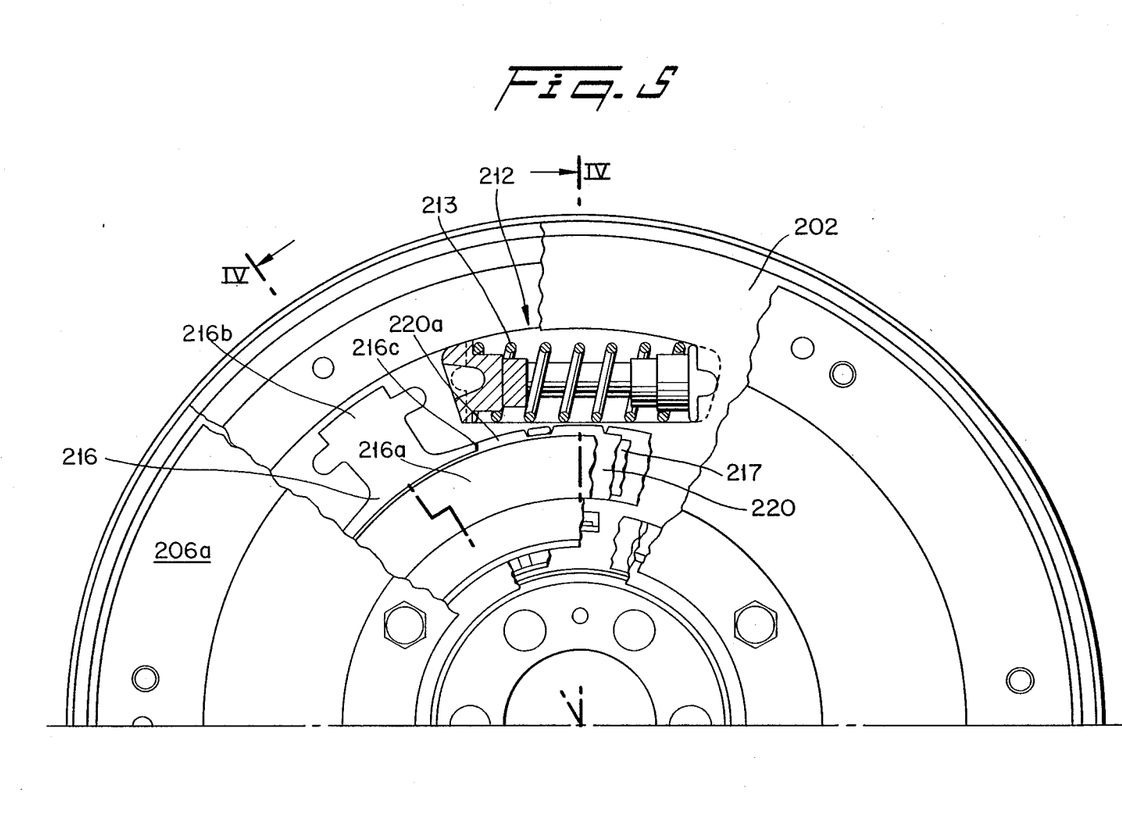
FIG. 5 is a partially sectional, elevation view showing an internal construction of the device of FIG. 4

In the third embodiment of the torque variation absorbing device in FIGS. 4 and 5, a damping and torque limiting mechanism 215, which is carried by the flywheel 206, comprises a driven disk 216, linings 216a, 216a, a pressure plate 220 and a cone spring 217. The pressure plate 220 has a projection 220a to be inserted in a recess 216c provided in the radially outer periphery of the disk 216 and to rotate with the driven disk 216. One of the linings 216a, 216a is disposed between the flange 206d of the driven plate 206b and the driven disk 216, and the other of the linings 216a, 216a is disposed between the flywheel body 206a and the pressure plate 220. The cone spring 217 is disposed between the driven disk 216 and the pressure plate 220 to press the driven disk 216 against the flange of the driven plate 206b and to press the pressure plate 220 against the flywheel body 206a. The driven disk 216 includes a projection 216b crossing the center of the end face of the spring mechanism 212, and the thickness [T] of the driven disk 216 is equivalent to the thickness [2t] of the driven disks 916, 916 of FIG. 7.

Therefore, the distance between the flange of the driven plate 206b and the center of the end face of the spring mechanism 212 is the sum of the thickness of the lining 216a and the half of the thickness [T/2] of the driven disk 216.

Figure 6:
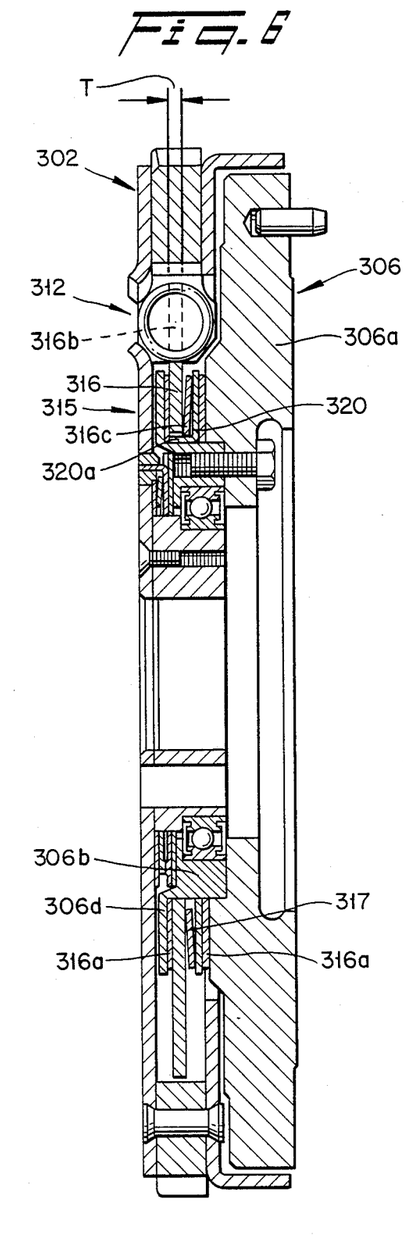
FIG. 6 is a sectional view of a torque variation absorbing device constructed in accordance with a fourth embodiment of the present invention.

In the fourth embodiment of the torque variation absorbing device in FIG. 6, a damping and torque limiting mechanism 315, which is carried by the flywheel 306, comprises a driven disk 316, linings 316a, 316a, a pressure plate 320 and a cone spring 317. The pressure plate 320 has a projection 320a to be inserted in to a recess 316c of the inner periphery of the driven disk 316 and to rotate with the driven disk 316. One of the linings 316a, 316a is disposed between the flange 306d of the driven plate 306b and the driven disk 316, and the other of the linings 316a, 316a is disposed between the flywheel body 306a and the pressure plate 320. The cone spring 317 is disposed between the driven disk 316 and the pressure plate 320 to press the driven disk 316 against the flange 306d of the driven plate 306b and to press the pressure plate 320 against the flywheel body 306a. The driven disk 316 includes a projection 316b crossing the center of the end face of the spring mechanism 312, and the thickness [T] of the driven disk 316 is equivalent to the thickness [2t] of the driven disks 916, 916 of FIG. 7.

Therefore, the distance between the flange of the driven plate 306b and the center of the end face of spring mechanism 312 is the sum of the thickness of the lining 316a and the half of the thickness [T/2] of the driven disk 316.

Although only several preferred embodiments of the present invention have been described in detail, it will be appreciated by those skilled in the art that various modifications and alterations can be made of the preferred embodiments shown without materially departing from the novel teachings and advantages of this invention. Accordingly, it is to be understood that all such modifications and alterations are included within the scope of the invention as defined by the following claims.

What is claimed is:

1. A torque variation absorbing device comprising:
    a driving plate adapted to be coupled to a driving shaft and including a pair of steel side plates, a ring-shaped outer body clamped between said pair of side plates, and a ring-shaped inner body clamped to one of said plates, said outer body and said inner body being coaxial about an axis extending in an axial direction;
    a flywheel including a flywheel body having a first housing defining surface, and a driven plate connected with said flywheel body and having a second housing defining surface, a housing being defined between said first and second housing defining surfaces, said flywheel being coaxial with said driving plate and rotatably supported by a bearing member on said driving plate;
    a spring mechanism interposed between said driving plate and said flywheel; and
    a damping and torque limiting mechanism and a hysteresis mechanism interposed between said driving plate and said flywheel, said damping and torque limiting mechanism being positioned radially inwardly of said spring mechanism and within said housing, and including a driven disk and a cone spring for pressing said driven disk axially against one of said first and second housing defining surfaces, said driven disk being rotatable independently of said flywheel when torque acting on said driving plate exceeds frictional force between said driven disk and said flywheel, said driven disk including a projection crossing an axial center of an end face of said spring mechanism, said damping and torque limiting mechanism further including a pressure plate mounted within said housing for movement with one of said driven disk and said flywheel, said pressure plate cooperating with said cone spring to exert pressure on the driven disk in said axial direction.

2. The torque variation absorbing device of claim 1, wherein said pressure plate has a radially outermost surface located radially inwardly of said spring mechanism.

3. The torque variation absorbing device of claim 1, wherein said spring mechanism includes two spring seats, one of said spring seats being engageable with said driven disk and the other of said spring seats being engageable with a projection of one of said side plates.

4. The torque variation absorbing device of claim 3, wherein said projection of said one of said side plates extends in said axial direction.

5. The torque variation absorbing device of claim 1, wherein said pressure plate is movable in said axial direction.

6. A torque variation absorbing device comprising:
a driving plate adapted to be coupled to a driving shaft and including a pair of steel side plates, a ring-shaped outer body clamped between said pair of side plates, and a ring-shaped inner body clamped to one of said plates, said outer body and said inner body being coaxial about an axis extending in an axial direction;
a flywheel including a flywheel body having a first housing defining surface, and a driven plate connected with said flywheel body and having a second housing defining surface, a housing being defined between said first and second housing defining surfaces, said flywheel being coaxial with said driving plate and rotatably supported by a bearing member on said driving plate;
a spring mechanism interposed between said driving plate and said flywheel; and
a damping and torque limiting mechanism and a hysteresis mechanism interposed between said driving plate and said flywheel, said damping and torque limiting mechanism being positioned radially inwardly of said spring mechanism and within said housing, and including a driven disk and a cone spring for pressing said driven disk axially against one of said first and second housing defining surfaces, said driven disk including a projection crossing an axial center of an end face of said spring mechanism, said damping and torque limiting mechanism further including a pressure plate mounted within said housing for movement with one of said driven disk and said flywheel, said pressure plate cooperating with said cone spring to exert pressure on the driven disk in said axial direction;
a plurality of friction linings,
one of said linings being positioned between a flange of said driven plate and said driven disk,
another of said linings being positioned between said pressure plate and said driven disk,
said cone spring being positioned between said flywheel body and said pressure plate, and
said pressure plate being connected to said flywheel for rotating with said flywheel.

7. The torque variation absorbing device of claim 6, wherein;
said pressure plate is connected to said driven plate by means of a projection having a radially inward periphery which is engaged with a radially outward periphery of said driven plate.

8. The torque variation absorbing device of claim 6, wherein;
said pressure plate is connected to said flywheel body by means of a projection of said pressure plate received in a slot of said flywheel body.

9. The torque variation absorbing device of claim 6, wherein said pressure plate has a radially outermost surface located radially inwardly of said spring mechanism.

10. The torque variation absorbing device of claim 6, wherein said spring mechanism includes two spring seats, one of said spring seats being engageable with said driven disk and the other of said spring seats being engageable with a projection of one of said side plates.

11. The torque variation absorbing device of claim 10, wherein said projection of said one of said side plates extends in said axial direction.

12. The torque variation absorbing device of claim 6, wherein said driven disk is rotatable independently of said flywheel when torque acting on said driving plate exceeds frictional force between said driven disk and said flywheel.

13. A torque variation absorbing device comprising:
a driving plate adapted to be coupled to a driving shaft and including a pair of steel side plates, a ring-shaped outer body clamped between said pair of side plates, and a ring-shaped inner body clamped to one of said plates, said outer body and said inner body being coaxial about an axis extending in an axial direction;
a flywheel including a flywheel body having a first housing defining surface, and a driven plate connected with said flywheel body and having a second housing defining surface, a housing being defined between said first and second housing defining surfaces, said flywheel being coaxial with said driving plate and rotatably supported by a bearing member on said driving plate;
a spring mechanism interposed between said driving plate and said flywheel;
a damping and torque limiting mechanism and a hysteresis mechanism interposed between said driving plate and said flywheel, said damping and torque limiting mechanism being positioned radially inwardly of said spring mechanism and within said housing, and including a driven disk and a cone spring for pressing said driven disk axially against one of said first and second housing defining surfaces, said driven disk including a projection crossing an axial center of an end face of said spring mechanism, said damping and torque limiting mechanism further including a pressure plate mounted within said housing for movement with one of said driven disk and said flywheel, said pressure plate cooperating with said cone spring to exert pressure on the driven disk in said axial direction;
a plurality of linings,
one of said linings being disposed between a flange of said driven plate and said driven disk,
another of said linings being disposed between said pressure plate and said flywheel body,
said cone spring being positioned between said pressure plate and said driven disk, and
said pressure plate being connected to said driven disk for rotating with said driven disk.

14. The torque variation absorbing device of claim 13, wherein;
said pressure plate is connected to said driven plate by means of a radially outwardly extending projection of said pressure plate received in a recess between projections of said driven disk.

15. The torque variation absorbing device of claim 13, wherein;
said pressure plate is connected to said driven plate by means of a radially inwardly extending projection, said pressure plate being received in a recess radially inwardly of said driven disk.

16. The torque variation absorbing device of claim 13, wherein said pressure plate has a radially outermost surface located radially inwardly of said spring mechanism.

17. The torque variation absorbing device of claim 13, wherein said spring mechanism includes two spring seats, one of said spring seats being engageable with said driven disk and the other of said spring seats being engageable with a projection of one of said side plates.

18. The torque variation absorbing device of claim 17, wherein said projection of said one of said side plates extends in said axial direction.

19. The torque variation absorbing device of claim 13, wherein said driven disk is rotatable independently of said flywheel when torque acting on said driving plate exceeds frictional force between said driven disk and said flywheel.

* * * * *